UNITED STATES PATENT OFFICE

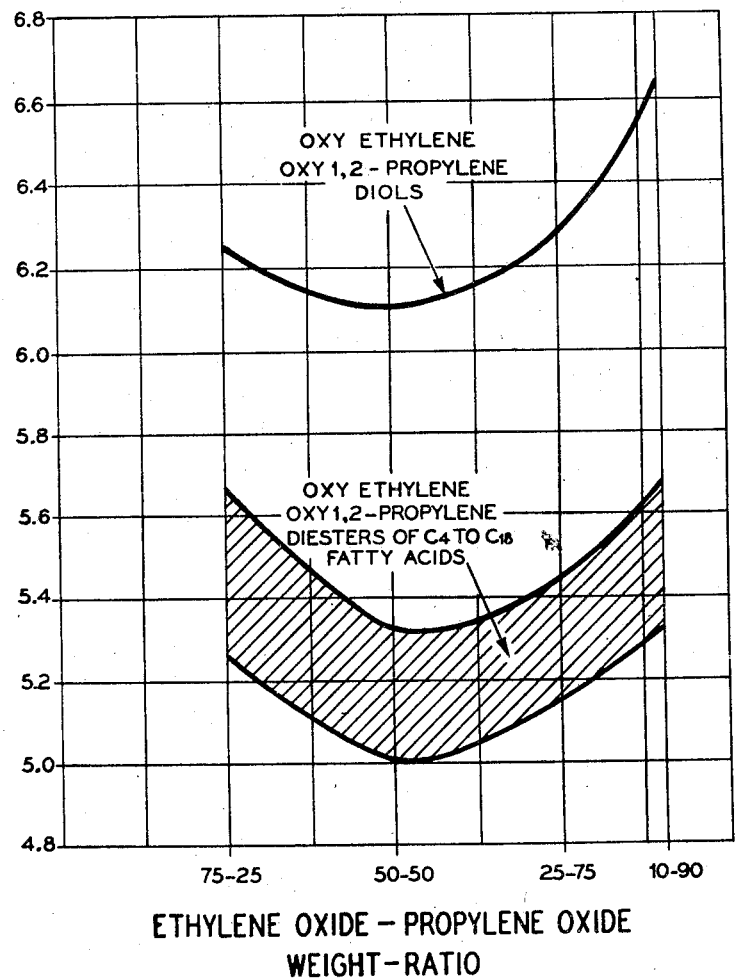

2,457,139
ESTERS OF POLYOXYALKYLENE DIOLS

Harvey R. Fife, Mount Lebanon, Pa., and Walter J. Toussaint, South Charleston, W. Va., assignors to Carbide and Carbon Chemicals Corporation, a corporation of New York Application February 26, 1946, Serial No. 650,318

9 Claims. (Cl. 260—410.6)

This invention relates to esters of dihydroxy polyoxyalkylene compounds which are glycols or diols. It is more particularly concerned with esters of mixtures of such glycols or diols having a relatively high average molecular weight and comprising molecules containing polyoxyalkylene chains formed predominantly of the oxyethylene group, —OC₂H₄O—, and the oxy 1,2-propylene group, OC₂H₃·CH₃—. Such mixtures may result, for instance, from the reaction of aliphatic diols or glycols, with alkylene oxide mixtures containing, for the most part, ethylene oxide and 1,2-propylene oxide. The mixtures of glycols or diols may be partially or completely esterified with acylating agents, in particular fatty acid chlorides, fatty acids, or fatty acid anhydrides.

As described in application Serial No. 589,646 of W. J. Toussaint and H. R. Fife, filed April 21, 1945, now Patent No. 2,425,845, of which this application is a continuation-in-part, the mixtures of polyoxyalkylene diols may be obtained by the reaction, with an aliphatic dihydroxy alcohol, of a mixture of ethylene oxide and 1,2-propylene oxide containing at least one-third part of 1,2-propylene oxide for each part of ethylene oxide, by weight. The reaction which takes place between the aliphatic dihydroxy alcohol starting material and the ethylene oxide and 1,2-propylene oxide seems to be a simple addition wherein the alkylene oxide molecules are converted to the corresponding oxyalkylene groups or radicals. The aliphatic dihydroxy alcohol may itself be regarded as the reaction product of water with an aliphatic oxide or ether in accordance with the following general equation:

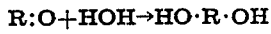

wherein R is a divalent aliphatic group such that the OH groups are alcoholic and attached to different carbon atoms thereof. When the aliphatic dihydroxy alcohol is a glycol of the ethylene glycol or 1,2-propylene glycol series, water may be regarded as the ultimate starting material, and for any given molecule of the resultant mixture the reaction may be illustrated by the general equation as follows:

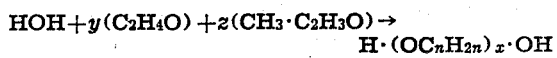

wherein $y$ and $z$ represent the moles of ethylene oxide and propylene oxide respectively; $n$ is both 2 and 3 in a single molecule, the number of times $n$ has a value of 2 being equal to $y$ and the number of times $n$ has a value of 3 being equal to $z$; and $x$ is the total number of the oxyethylene and oxy-1,2-propylene groups, being equal to the sum of $y$ and $z$.

From such properties as average molecular weight, refractive index, density, viscosity, rate of change of viscosity with change in temperature, as well upon theoretical considerations, it appears that the compositions which may be obtained by the reaction of the mixture of ethylene oxide and 1,2-propylene oxide with an aliphatic dihydroxy alcohol are complex mixtures of polyoxyalkylene diols, having polyoxyalkylene chains of different lengths and different internal configuration with the hydroxyl groups appearing at the ends of the chains, and containing in a single molecule both the oxyethylene group and the oxy 1,2-propylene group, and if the starting material is other than ethylene glycol or propylene glycol, the oxyaliphatic radical corresponding to the dihydroxy starting material.

By way of illustration, in a polyoxyalkylene dihydroxy compound in which the only oxyalkylene groups present in the molecule are oxyethylene and oxy 1,2-propylene, a polyoxyalkylene chain of five such groups would have a molecular weight of 234, 248, 262 and 276, respectively, exclusive of the water, depending upon whether one, two, three, or four oxy 1,2-propylene groups are present; and in a mixture of such compounds the average molecular weight attributable solely to the oxyalkylene chain would be between 234 and 276, with an oxide ratio corresponding thereto from 75.2–24.8 to 15.9–84.1, respectively. By oxide ratio of the mixture of alkylene oxide is meant the proportion, by weight, of ethylene oxide to propylene oxide present, the proportion of 1,2-propylene oxide being given last as for instance a composition having an oxide ratio of 75–25 being obtainable by using an oxide mixture containing one-third part of 1,2-propylene oxide for each part by weight of ethylene oxide.

Similarly, the molecular weights of the oxyethylene oxy 1,2-propylene chains of dihydroxy compounds having a total of six oxyalkylene groups to the molecule with two, three, four and five oxy 1,2-propylene groups present therein would be 292, 306, 320 and 334, respectively; and in mixtures of such compounds the portion of the average molecular weight attributable solely to the oxyalkylene chain would be between 292 and 334, with an oxide ratio between 60.3–39.7 and 13.2–86.8 corresponding thereto. Compounds having but a single oxy 1,2-propylene group would have an oxyethylene content above that of compositions having a 75–25 oxide ratio and are omitted.

In compounds having a total of seven oxyalkylene groups to the molecule with two, three, four, five or six oxy 1,2-propylene groups present therein, the molecular weight attributable to the oxyethylene oxy 1,2-propylene chain would be 336, 350, 364, 378 and 392, respectively; and in mixtures of such compounds the average molecular weight attributable solely to the polyoxyalkylene chain would be between 336 and 392 with an oxide ratio between 65.8–34.5 and 11.2–88.8 corresponding thereto.

Likewise, in compounds having from two to seven oxy 1,2-propylene groups, in an oxyethylene oxy 1,2-propylene chain of eight oxyalkylene groups, the molecular weights of such chains would be 380, 394, 408, 422, 436 and 450, respectively; and in a mixture of such compounds the average molecular weight attributable to the polyoxyalkylene chain would be between 380 and 450, with an oxide ratio corresponding thereto between 69.5–30.5 and 9.8–90.2. To each of the values for molecular weights and average molecular weights there is to be added a value of 18, the molecular weight of water, to arrive at the corresponding value for either the diol compositions, or for a dihydroxy compound which is a constituent of the composition, as the case may be.

A composition having in admixture none but the diols of the foregoing polyoxyethylene oxy 1,2-propylene chains would comprise as many as nineteen different compounds or constituents, each differing from one another in molecular weight with but a spread of from 252 to 468 in molecular weight, from five to eight oxyalkylene groups between the smallest and largest molecules. Depending upon the relative proportions of the nineteen constituents, the composition would have an oxide ratio between 75–25 and about 10–90, and an average molecular weight between 252 and 468. In the compositions of the present invention the complexity of the mixtures may be due not only to the differences in molecular weights of the constituents, but also to the large number of isomers which may be formed by the random (i. e. interspersed) distribution of the oxyethylene and oxy 1,2-propylene groups, with consequent variations in internal configuration from molecule to molecule, even among those of the same molecular weight. The higher the molecular weight of the compositions the more complex is the mixture. These diol compositions may be referred to as mixtures of heteric oxyethylene oxy 1,2-propylene diols, and by the term "heteric" we mean that the diol constituents of the mixture vary in internal configuration from molecule to molecule, such variation arising out of a randomness of the distribution of the oxyethylene and the oxy 1,2-propylene groups therein, such as results, for instance, from the concurrent reaction of ethylene oxide and the 1,2-propylene oxide on the starting material and the intermediate addition products.

Using ethylene oxide 1,2-propylene oxide mixtures having at least one-third part of 1,2-propylene oxide for each part of ethylene oxide, by weight, and using various aliphatic dihydroxy alcohols as starting materials, there have been produced a number of polyoxyalkylene diol compositions having oxide ratios from 75–25 to 25–75 with average molecular weights ranging from about 300 upwards, and using oxide ratios of about 9 parts of 1,2-propylene oxide for each part of ethylene oxide, there have been made diol compositions having an oxide ratio of about 10–90 and with average molecular weights of about 800 upwards. At ranges of average molecular weights as high as 10,000 to 20,000 they may be obtained as normally liquid compositions which are characterized by a relatively low rate of change of viscosity with change in temperature as compared with other normally liquid diols of approximately the same viscosity for a given temperature, with the actual viscosity as well as such other properties as density, refractive index and the like for a particular diol composition being dependent on such factors as oxide ratio, average molecular weight and the like. For instance, at oxide ratios of 50–50 the absolute density at 210° F. of polyoxyalkylene diol compositions in which the oxyalkylene groups are oxyethylene and oxy 1,2-propylene is approximately 1.0, for average molecular weights from about 400 to 3,500 and upwards. With higher oxypropylene content the absolute density at 210° F. of the composition decreases to a value of about 0.95 for oxide ratios of 10–90; and with an oxypropylene content below 50–50 it increases to a value of about 1.03, over substantially the same ranges of average molecular weights. Over a range of oxide ratios from 75–25 to 25–75 and a range of average molecular weight from about 400 to 2,500 and above, the higher the average molecular weight and the lower the oxypropylene content of the composition the higher the viscosity. The viscosities appear to lie in a narrow band or zone which, at a temperature of 210° F., for instance, extends from about 3 to 12 centistokes for an average molecular weight of about 300 to 700 to about 40 to 130 centistokes for an average molecular weight from 3,200 to 4,200. For oxide ratios from 50–50 to 10–90, at a temperature of 20° F., the viscosities extend from 700 to 1,200 centistokes at average molecular weights from 300 to 700 up to 5,000 to 14,000 centistokes at average molecular weights from 3,000 to 3,500.

In general, the diol compositions in which the oxyethylene content is larger than the oxy 1,2-propylene content exhibit a substantially greater degree of miscibility with water or greater water tolerance than those having a lesser oxyethylene content. By way of illustration, diol compositions in which the oxyalkylene groups are oxyethylene and oxy 1,2-propylene in about a 50–50 oxide ratio are miscible with cold water in all proportions over a range of average molecular weights from about 300 to upwards of 3,000; and up to an average molecular weight of about 450 to 600 they are also miscible in all proportions in hot water up to a temperature of 100° C. Beginning with an average molecular weight of about 600 to 800, depending possibly upon variations in the particular distribution of the oxyethylene and the oxy 1,2-propylene groups within and among the molecules, such compositions are characterized by the property of being miscible with cold water up to a concentration of about 50 percent or more of the one in the other and relatively immiscible with hot water. At a temperature of about 40° C. to 60° C. or higher, an aqueous solution containing about 50 percent of such a composition separates into two layers, one of the layers being a solution of water in the diol composition and the other layer being a solution of the diol composition in water.

Diol compositions in which the oxy 1,2-propylene content is higher than the oxyethylene content are not miscible with water in all proportions at ordinary temperatures except possibly in the lower ranges of average molecular weight, and with increasing temperature even this limited miscibility diminishes. In any particular case, the temperature at which two layers or phase may be formed from a homogeneous diol composition-water system may depend upon a number of factors including the method of making the diol compositions, the average molecular weights and the like. Because of the difficulty of maintaining dry reaction conditions, diol compositions of high average molecular weight made by the addition of alkylene oxides to a glycol starting material may contain a small amount of glycols of low molecular weight from the starting of new chains during the reaction, and the presence of a small amount of such low molecular weight glycols may, in turn, give rise to an erroneous indication of water-miscibility which is not truly characteristic of the mixture of high molecular weight compounds of which the diol composition is predominantly composed.

Over a range of oxide ratios from 50-50 to 25-75 and higher oxy 1,2-propylene content, it appears also that the diol compositions will dissolve more water than water dissolves the compositions. In general, a diol composition having an oxide ratio of about 25-75 and an average molecular weight of about 450 to 550 is completely miscible with cold water (i. e. at a temperature of about 0° to 20° C.), but on heating the aqueous solution to a temperature of about 90° C., two phases separate. Similarly, a composition of about the same oxide ratio but having an average molecular weight of 1,300 to 1,400, approximately, is soluble in cold water to about 30 to 40 per cent by weight. The aqueous solution separates into two phases on heating to a temperature of about 25° to 30° C.

Esterification of the foregoing mixtures of polyoxyalkylene diols with fatty acids results in new compositions having significantly different properties depending on the degree of esterification and the type of fatty acid involved. Partial esterification of diol compositions having an oxide ratio of 75-25 with higher fatty acids, such as stearic acid, results in compositions which are good emulsifying agents. Unlike the stearic acid esters of polyethylene glycols of high average molecular weight, i. e. above 800, which are waxy or greasy solids at ordinary room temperature, the partial stearate esters of the oxyethylene oxy 1,2-propylene diols having an oxide ratio of 75-25 and of high average molecular weight are liquids at ordinary temperature. They are permanently soluble in a widely used insect repellent, 2-ethylhexanediol-1,3, to form water-dispersible compositions, and water dispersions prepared from these compositions have proved to be decidedly useful in impregnating cloth to impart insect repellent properties to the cloth. On the other hand, the stearate esters of the polyethylene glycols are not permanently soluble in 2-ethylhexanediol-1,3 but tend to flocculate and settle out of solution on storage or on exposure to reduced temperatures. The partial fatty acid esters of the oxyethylene oxy 1,2-propylene diols are also good emulsifying agents for other insect repellents, such as dimethyl phthalate. Both the partial and complete higher fatty acid esters of oxyethylene oxy 1,2-propylene diols having an oxide ratio of 75-25 and of high average molecular weight, i. e. above 1,500 are soluble in water to form aqueous solutions having marked foaming action. In general, however, the fatty acid esters of oxyethylene oxy 1,2-propylene diols are less water-miscible than the original diol compositions.

The esters of the oxyethylene oxy 1,2-propylene diols with fatty acids exhibit a lower rate of change of viscosity with temperature than do the diols themselves. It has also been observed that, in general, the lower fatty acid esters have a lower rate of rate of change of viscosity with temperature than do the higher fatty acid esters of the same diols. The rate of change of viscosity with temperature is also dependent on the ratio of ethylene oxide to propylene oxide employed in making the diols and on the viscosity of the diol or its ester. These relationships are shown in the attached drawing. The data on which this drawing is based is given below, the viscosity ratios being determined for fluids having a viscosity of 100 centistokes at 100° F. by interpolation of the experimental data shown in Examples 5 to 16.

Table I

| Oxide Ratio | Ratio of Viscosity at 100° F. to Viscosity at 210° F. for Fluids having a Viscosity of 100 Centistokes at 100° F. | | |
|---|---|---|---|
| | Diol | Diol distearate | Diol dibutyrate |
| 75-25 | 6.24 | 5.66 | 5.25 |
| 50-50 | 6.10 | 5.34 | 5.00 |
| 25-75 | 6.27 | 5.40 | 5.45 |
| 10-90 | 6.63 | 5.65 | 5.46 |

In general, complete esterification of the oxyethylene oxy 1,2-propylene diols with a lower fatty acid, such as acetic, propionic or butyric acids, results in a fluid having a lower viscosity than the diol starting material. In general, complete esterification of the diols with a higher fatty acid, such as stearic acid, results in a fluid having a lower viscosity if the original diols are of relatively high average molecular weight, and results in a fluid having a higher viscosity if the original diols are of relatively low molecular weight.

The foregoing improvements in viscosity temperature relationships are significant, and the new esters are especially well adapted to serve as metal lubricants where fluidity at low temperatures is required.

Substantially complete esters of the oxyethylene oxy 1,2-propylene diols may be prepared by using two or more moles of the fatty acid per mole of the diols in the reaction mixture and the use of less than two moles of the fatty acid results in a partial ester. (A molar quantity of the diols is based on the average molecular weight of the diol mixtures.) In either event, substantially the same procedure may be employed for making the partial or the complete esters of the diols. Where higher fatty acids are employed in the esterification, such as lauric, oleic, stearic or ricinoleic acids, it is advantageous to remove the water of condensation by conducting the reaction in the presence of a mineral acid catalyst and under reduced pressures accompanied by purging with an inert gas, such as carbon dioxide or nitrogen. It has been found that this method yields products of light color. On the other hand, when more volatile acids are employed in the esterification, such as butyric, 2-ethylbutyric, and 2-ethylhexanoic acid, the use of an entraining agent, such as benzene or diisopropyl ether, is preferable in order to reduce the kettle temperature and to prevent losses of the more volatile acids. Finally, when it is desired to add the acetate or propionate radical as the ester group, it is frequently convenient to employ the acid anhydrides or acyl chlorides as acylating agents.

The following examples will serve to illustrate the invention:

EXAMPLE 1

*Distearate of diols having an oxide ratio of 50-50*

In a flask of one liter capacity, a mixture of 302 grams (0.30 mole) of an oxyethylene oxy 1,2-propylene diol having an oxide ratio of 50-50, 163 grams (0.60 mole) of commercial stearic acid and 2.33 grams of sulfuric acid was heated to 120° C., the pressure being reduced to 20 mm. of Hg, and the charge being agitated by gentle, sub-surface ebullition of carbon dioxide. During a period of 9.5 hours at 120-125° C., the total acidity of the system (including that of the catalyst) was reduced to 3.1 per cent, calculated as stearic acid. The catalyst was then neutralized by the addition of 2.3 grams of sodium hydroxide in a 37% by weight aqueous solution, the mixture being agitated for 20 minutes at 70–80° C. The product was stripped at 125° C. and 18 mm. of Hg pressure to remove water and finally filtered to remove the inorganic salt.

The final ester product was a liquid, having a final free acidity of 1.2% by weight calculated as stearic acid. By saponification, the combined stearic acid was found to be 37.1% by weight (theoretical—36.0%), or equal to 2.07 moles of stearic acid per mole of oxyethylene oxy 1,2-propylene diol. The stearic used was a triple-pressed grade having an equivalent weight of 272 (theoretical=284).

EXAMPLE 2

*Distearate of diols having an oxide ratio of 10–90*

A charge of 400 grams (0.50 mole) of an oxyethylene oxy 1,2-propylene diol having an oxide ratio of 10–90, 272 grams (1.00 mole) of commercial stearic acid (combining weight=272) and 3.36 grams of sulfuric acid was reacted, as described in Example 1, for 9.0 hours until the total free acidity declined to 2.75%, calculated as stearic acid. The catalyst was then neutralized with 4.0 grams of sodium hydroxide, added as a 3.7% by weight aqueous solution. After agitation for one hour at 60–70° C., the ester was stripped to remove water at 140° C. and 25 mm. of Hg pressure and filtered.

The final free acidity of the ester was 0.42% as stearic, and saponification showed the presence of 42.0% of combined stearic acid (theoretical=41.6% for distearate ester).

EXAMPLE 3

*Dibutyrate of diols having an oxide ratio of 50–50*

In a flask having a one liter capacity equipped with a reflux condenser and a trap for separating water from the reflux, 402 grams (0.40 mole) of oxyethylene oxy 1,2-propylene diols having an oxide ratio of 50–50, 70.4 grams (0.80 mole) of butyric acid, 1.90 grams of sulfuric acid and 160 cc. of benzene were refluxed at 105° C. for 15 hours. Approximately the theoretical amount of water was separated in the trap, while the free acidity of the charge (including the catalyst) was reduced to 0.95% by weight, calculated as butyric acid. The catalyst was neutralized with 2.2 grams of sodium hydroxide, added as a 37% by weight aqueous solution, by agitation at room temperature for 30 minutes. The product was stripped free of benzene and water by heating at 104° C. and 50 mm. of Hg pressure, and filtered.

The final, free acidity of the dibutyrate ester was 0.20% by weight calculated as butyric acid, and saponification showed the combined butyric acid to be 14.3% by weight (theoretical for dibutyrate ester = 15.3%).

EXAMPLE 4

*Dibutyrate of diols having an oxide ratio of 10–90*

A charge consisting of 400 grams (0.50 mole) of an oxyethylene oxy 1,2-propylene diol, 88 grams (1 mole) of butyric acid, 1.96 grams of sulfuric acid and 180 cc. of benzene was reacted, as described in Example 3 for 17 hours at 105° C. The amount of water removed was 18 grams (1 mole) and the free acidity of the system was reduced to 1.1% by weight, calculated as butyric acid. The reaction mixture was agitated for 20 minutes at room temperature with 2.4 grams of sodium hydroxide, added as a 37% by weight aqueous solution, and thereafter stripped free of benzene and water at 135° C. and 45 mm. of Hg pressure. The filtered ester had a free acidity equal to 0.15% by weight as butyric acid and contained by saponification, 18.8% of combined butyric acid (theoretical for dibutyrate=18.8%).

EXAMPLES 5 TO 16

*Diesters of diols of different average molecular weights and oxide ratios*

A series of diesters of oxyethylene oxy 1,2-propylene diols of different average molecular weights and varying oxide ratios were prepared. The distearates were made by the methods shown in Examples 1 and 2, and the dibutyrates were made by the procedure illustrated in Examples 3 and 4. The physical properties of all these products including those of Examples 1 to 4, as well as the diol starting materials are given in the table to follow:

*Table II*

| | Oxide Ratio | Av. Mol. Wt. of Diol [1] | Viscosity Centistokes | | | Ratio of Visc. 100° F. to Visc. 210° F. | Density 100° F., g./cc. |
|---|---|---|---|---|---|---|---|
| | | | 210° F. | 130° F. | 100° F. | | |
| Diol | 75–25 | 1,243 | 26.2 | 86.5 | 164 | 6.25 | 1.0774 |
| Disterate of diol | | | 25.0 | 76.6 | 143 | 5.75 | 1.0030 |
| Dibutyrate of diol | | | 19.4 | 56.2 | 102 | 5.25 | 1.0642 |
| Diol | 75–25 | 2,590 | 66.7 | 222 | 420 | 6.30 | 1.0765 |
| Disterate of diol | | | 59.6 | 196 | 373 | 6.25 | 1.0384 |
| Dibutyrate of diol | | | 56.7 | 176 | 336 | 5.92 | 1.0699 |
| Diol | 50–50 | 1,006 | 12.5 | 40.3 | 76.3 | 6.10 | 1.0472 |
| Disterate of diol | | | 16.2 | 47.2 | 85.8 | 5.30 | 0.9757 |
| Dibutyrate of diol | | | 11.8 | 29.8 | 52.5 | 4.45 | 1.0362 |
| Diol | 50–50 | 1,911 | 28.7 | 93.5 | 175 | 6.10 | 1.0511 |
| Disterate of diol | | | 31.5 | 96.5 | 178 | 5.65 | 1.0041 |
| Dibutyrate of diol | | | 25.4 | 75.3 | 138 | 5.43 | 1.0459 |
| Diol | 25–75 | 556 | 6.7 | 22.3 | 43.4 | 6.46 | 1.0178 |
| Disterate of diol | | | 10.7 | 31.0 | 55.3 | 5.16 | 0.9360 |
| Dibutyrate of diol | | | 5.6 | 14.5 | 24.4 | 4.38 | 1.0040 |
| Diol | 25–75 | 1,524 | 18.3 | 59.3 | 114 | 6.23 | 1.0196 |
| Disterate of diol | | | 21.4 | 64.9 | 120 | 5.60 | 0.9763 |
| Dibutyrate of diol | | | 15.6 | 44.8 | 81.5 | 5.22 | 1.0155 |
| Diol | 10–90 | 801 | 8.4 | 28.5 | 56.8 | 6.75 | 1.0012 |
| Disterate of diol | | | 12.9 | 38.5 | 69.5 | 5.40 | 0.9415 |
| Dibutyrate of diol | | | 7.4 | 20.6 | 35.7 | 4.82 | 0.9935 |
| Diol | 10–90 | 1,861 | 19.9 | 67.0 | 130 | 6.55 | 1.0010 |
| Disterate of diol | | | 24.8 | 76.1 | 143 | 5.76 | 0.9682 |
| Dibutyrate of diol | | | 21.1 | 65.4 | 121 | 5.75 | 0.9990 |

[1] Calculated from acetyl value on basis that each molecule contains two hydroxyl groups.

EXAMPLE 17

*Partial stearate ester of diols having an oxide ratio of 75–25*

Into a steam jacketed, stainless steel kettle were charged 22.8 pounds (0.01 lb. mole) of an oxyethlene oxy, 1,2-propylene diol having an oxide ratio of 75–25 and a viscosity of 48.5 centistokes at 210° F., 2.8 pounds (0.01 lb. mole) of stearic acid and 28 grams of sulfuric acid. This mixture was heated to 140° C. under a pressure of 15 mm. of Hg, agitation being provided by bubbling carbon dioxide through the charge. After four hours, the total acidity was 0.3% calculated as sulfuric acid, and the kettle was allowed to cool. When the temperature of the kettle contents reached 60° C., 35 grams of sodium carbonate was added and agitation with carbon dioxide continued for 10 minutes. Thereafter, the product was allowed to settle, and decanted from inorganic residues. The partial ester thus formed was a water-soluble liquid having good emulsifying properties, particularly for the insect repellent 2-ethylhexanediol 1,3.

EXAMPLE 18

*Di(2-ethylhexanate) of diols having an oxide ratio of 50–50*

To 200 grams (0.49 mole) of oxyethylene oxy 1,2-propylene diols having an oxide ratio of 50–50 were added 204.6 grams (1.27 moles) of 2-ethylhexoyl chloride over a period of 1.75 hours at 25 to 40° C. The mixture was thoroughly agitated and carbon dioxide was blown through it over a period of 4.5 hours to remove hydrochloric acid. The resulting product was stripped of excess acid and acid chloride by heating to 130° C. at 12 mm. of Hg pressure. The di-ester was treated with decolorizing carbon and filtered while hot. Saponification showed that the combined 2-ethylhexanyl radical, $C_8H_{15}O$, was 42.8% by weight (theoretical for di-ester = 38.6%).

The viscosity of the di-ester was considerably lower than the diol starting material, and its change in viscosity with temperature was much reduced as shown by the data to follow:

|  | Diol | Diol Di(2-ethylhexanate) |
|---|---|---|
| Viscosity Centistokes: |  |  |
| 210° F | 5.74 | 4.77 |
| 130° F | 19.2 | 11.93 |
| 100° F | 37.5 | 20.15 |
| 20° F | 895 | 216.3 |
| 0° F | 3,639 | 634 |
| Ratios of Kinematic Viscosity: |  |  |
| 100/210° F | 6.53 | 4.22 |
| 20/210° F | 156 | 45.4 |
| 0/210° F | 634 | 132.9 |

Other significant properties of the di-ester are as follows:

Absolute density g./cc.:
210° F _____ 0.9169
130° F _____ 0.9617
100° F _____ 0.9780
20° C _____ 0.9963
Refractive index, 20° C _____ 1.4468
Flash point _____°F__ 417
Fire point _____°F__ 444
Pour point _____°F__ −70
Miscibility temperature with equal volume of mineral oil, S. A. E. 30 _____°C__ 38

The product of this example is useful as a metal lubricant where fluidity at low temperatures is required. It is also valuable as an ingredient of pressure transmission fluids.

EXAMPLE 19

*Di(2-ethylhexanate) of diols having an oxide ratio of 10–90*

To 200 grams (0.425 mole) of oxyethylene oxy 1,2-propylene diols having an oxide ratio of 10–90 were added 177 grams (1.09 moles) of 2-ethylhexoyl chloride over a period of 1.25 hours at a temperature of 25 to 40° C. The mixture was then agitated with carbon dioxide for a period of two hours. During the last half hour of this period, the pressure was reduced to 10.6 mm. of Hg and the temperature raised to 126° C. to remove the last traces of free acids. The residue, after stripping, was treated with decolorizing carbon and filtered. The combined 2-ethylhexanyl radical, $C_8H_{15}O$, was 37.8% by weight (theoretical for di-ester = 35.2%).

The viscosity of the di-ester was appreciably lower than the diol starting material, and its change in viscosity with temperature was reduced as shown by the data to follow:

|  | Diol | Diol Di(2-ethylhexanate) |
|---|---|---|
| Viscosity Centistokes: |  |  |
| 210° F | 5.24 | 5.22 |
| 130° F | 18.2 | 14.22 |
| 100° F | 36.5 | 25.05 |
| 20° F | 870 | 318.3 |
| 0° F | 3,544 | 1,002 |
| Ratios of Kinematic Viscosity: |  |  |
| 100/210° F | 6.97 | 4.80 |
| 20/210° F | 166 | 60.9 |
| 0/210° F | 676 | 191.9 |

Other significant properties of this di-ester are as follows:

Absolute density g./cc.:
210° F _____ 0.9087
130° F _____ 0.9415
100° F _____ 0.9536
20° C _____ 0.9670
Refractive index, 20° C _____ 1.4447
Flash point _____°F__ 432
Fire point _____°F__ 468
Pour point _____°F__ −70
Miscibility temperature with equal volume of mineral oil, S. A. E. 30 _____°C__ 35

The foregoing examples illustrate the preparation of partial and complete esters of the oxyethylene oxy 1,2-propylene diols by starting with the diol mixtures themselves. It is also possible to prepare the partial esters by reacting mixtures of ethylene and propylene oxides with the monoesters of ethlyene or propylene glycol, according to the methods disclosed in our application Serial No. 589,646, filed April 21, 1945 previously mentioned.

The invention is susceptible of modification within the scope of the appended claims.

We claim:

1. Fatty acid esters of a mixture of heteric oxyethylene-oxy 1,2-propylene diols in which ethylene oxide and 1,2-propylene oxide are combined therein as oxyethylene and oxy 1,2-propylene groups in a ratio which is at least one-third part of 1,2-propylene oxide for each part of ethylene oxide, by weight; said diols containing in a single molecule both the oxyethylene and the oxy 1,2-propylene groups and said mixture having an average molecular weight of at least 300 attributable to said groups.

2. Fatty acid esters of a mixture of heteric oxyethylene-oxy 1,2-propylene diols in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight; said diols containing in a single molecule both the oxyethylene and the oxy 1,2-propylene groups and said mixture having an average molecular weight of at least 400 attributable to said groups.

3. Fatty acid esters of a mixture of heteric oxyethylene-oxy 1,2-propylene diols in which ethylene oxide and 1,2-propylene oxide are combined therein as oxyethylene and oxy 1,2-propylene groups in a ratio from one-third part to about three parts of 1,2-propylene oxide for each part of ethylene oxide, by weight; said diols containing in a single molecule both the oxyethylene and the oxy 1,2-propylene groups and said mixture having an average molecular weight of at least 800 attributable to said groups.

4. Fatty acid esters of a mixture of heteric oxyethylene-oxy 1,2-propylene diols in which ethylene oxide and 1,2-propylene oxide are combined therein as oxyethylene and oxy 1,2-propylene groups in a ratio from one-third part to about one part of 1,2-propylene oxide for each part of ethylene oxide, by weight; said diols containing in a single molecule both the oxyethylene and the oxy 1,2-propylene groups and said mixture having an average molecular weight of at least 1000 attributable to said groups.

5. Partial fatty acid esters of a mixture of heteric oxyethylene-oxy 1,2-propylene diols in which ethylene oxide and 1,2-propylene oxide are combined therein as oxyethylene and oxy 1,2-propylene groups in a ratio from one-third part to about nine parts 1,2-propylene oxide for each part of ethylene oxide, by weight; said diols containing in a single molecule both the oxyethylene and the oxy 1,2-propylene groups and said mixture having an average molecular weight of at least 400 attributable to said groups.

6. Esters of stearic acid and a mixture of heteric oxyethylene-oxy 1,2-propylene diols in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight; said diols containing in a single molecule both the oxyethylene and the oxy 1,2-propylene groups and said mixture having an average molecular weight of at least about 400 attributable to said groups.

7. Partial esters of stearic acid and a mixture of heteric oxyethylene-oxy 1,2-propylene diols in which ethylene oxide and 1,2-propylene oxide are combined therein as oxyethylene and oxy 1,2-propylene groups in a ratio of one-third part of 1,2-propylene oxide for each part of ethylene oxide, by weight, said diols containing in a single molecule both the oxyethylene and the oxy 1,2-propylene groups and said mixture having an average molecular weight of at least about 1500 attributable to said groups.

8. Esters of butyric acid and a mixture of heteric oxyethylene-oxy 1,2-propylene diols in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight; said diols containing in a single molecule both the oxyethylene and the oxy 1,2-propylene groups and said mixture having an average molecular weight of at least about 400 attributable to said groups.

9. Esters of 2-ethylhexanoic acid and a mixture of heteric oxyethylene-oxy 1,2-propylene diols in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight; said diols containing in a single molecule both the oxyethylene and the oxy 1,2-propylene groups and said mixture having an average molecular weight of at least about 400 attributable to said groups.

HARVEY R. FIFE.
WALTER J. TOUSSAINT.

REFERENCES CITED

The following references are of record in the file of this patent:

UNITED STATES PATENTS

| Number | Name | Date |
|---|---|---|
| 2,269,529 | Goldsmith | Jan. 13, 1942 |
| 2,275,494 | Bennett | Mar. 10, 1942 |